July 11, 1972 M. C. AGENS ET AL 3,676,285

LAMINATES CONTAINING STANNOUS COMPOUND IN BONDING RESIN

Filed March 27, 1969

Inventors:
Maynard C. Agens;
Simon W. Kantor,
by James W. Underwood
Their Agent.

United States Patent Office
3,676,285
Patented July 11, 1972

3,676,285

LAMINATES CONTAINING STANNOUS COMPOUND IN BONDING RESIN

Maynard C. Agens, Burnt Hills, and Simon W. Kantor, Schenectady, N.Y., assignors to General Electric Company Filed Mar. 27, 1969, Ser. No. 811,012
Int. Cl. B32b *5/28, 15/02*
U.S. Cl. 161—93 8 Claims

ABSTRACT OF THE DISCLOSURE

The invention relates to a laminated structure comprising a substrate having on at least one of its two major surfaces at least one absorbent insulating lamina which has been impregnated and integrally bonded to said surface with a synthetic resin having incorporated therein a stannous compound.

In the last several years there has been a great upsurge in the production of metal plated plastic parts for both utilitarian and decorative purposes. The metal plated plastic parts for decorative purposes have generally taken the form of knobs, handles, buttons, grills, and other shaped objects made of thermoplastic, synthetic resins which have been plated with metal by various techniques. Where a durable metal coating on the plastic part is desired, the general technique is to use a thermoplastic resin which has been specifically formulated for the purpose. This resin requires a time consuming chemical treatment of the surface to permit deposition of a thin metal film by electroless plating techniques followed by deposition of a thicker metal coat by electroplating techniques. The chemical treatment required involves treatment with a strong oxidizing agent, for example, a chromic acid-sulfuric acid mixture followed by thorough washing, dipping in a solution of a stannous salt, a water wash, dipping in a noble metal salt solution followed by a water wash before electroless plating. The strong oxidizing reaction occurring during the acid treatment will deleteriously attack any masking material as well as the surface of the plastic making it necessary to treat the entire surface. Also since the treatments with the stannous salt and noble metal salt solutions will activate not only the desired surface but also the surface of the masking material, it is necessary to treat the entire surface of the thermoplastic part with the tin and noble metal salt solutions followed by masking of those areas where electroless plating is not desired, in order to produce a decorative pattern. Such a procedure is very wasteful of the very expensive noble metal salt required to treat all of the surface of the plastic when only certain areas are desired to be plated. Since the entire surface is etched by the oxidizing action, thereby affecting its appearance, this process is generally limited to those applications where the entire surface is to be metal plated.

The biggest use for metal plated plastic parts for utilitarian purposes is in the making of the so-called printed circuits, which are widely used in electronic devices, for example, as the electrical circuits connecting the various components of radios, television receivers, computers, etc. For these applications, generally, a laminated board comprising sheets of paper, cloth, including glass cloth, matted fibers, etc., bonded together with a synthetic resin, generally, a thermosetting resin, for example, phenol-formaldehyde resins, urea-formaldehyde resins, melamine-formaldehyde resins, thermosetting polyester resins, epoxy resins, etc., are used. For these applications, the laminate can have a metal foil, generally copper foil, laminated to either one or both of the two major surfaces in which case, the metal foil is etched away on certain of the areas leaving the balance of the metal foil intact as the desired circuit. This process, although very wasteful of the metal foil which is etched away, does produce electrical circuit boards having extreme durability and dependability, both under rough usage and during replacement of faulty components which requires resoldering. Generally, for such circuits, the metal foil is on both major surfaces and electrical connections are required between circuits etched on one side of the board and circuits etched on the opposite side of the board. To produce such connections through the board, passageways are drilled, punched, broached or otherwise formed at the points where the connection is desired. The walls of such passageways are metal plated by electroless plating techniques. In order to accomplish this, it is again necessary to treat the entire surface of the board with a solution of a stannous salt, followed by washing, then treatment with noble metal salt solution followed by washing. This procedure also necessitates masking all of the areas treated with the stannous and noble salt solutions where plating is not desired, prior to treating with the electroless solution. Again, this is wasteful of the expensive noble metal salt.

In those cases where the laminate is not metal-clad, the surfaces where circuits are to be formed on the laminate are roughened by sandblasting or sanding, and any passageways desired are formed. The entire laminate is treated with the stannous salt solution, washed, treated with the noble metal salt solution and washed. The surfaces where plating is not desired are masked and then the circuit both on the surface and on the walls of the passageways are plated with metal from electroless plating solution. Again there is a waste of the noble metal salt which has been deposited in those areas where electroless plating is not desired. Furthermore, since the passageways are prepunched, proper registration of the masked areas to insure coincidence of the circuit on the top and bottom surfaces with the connecting passageways is required. This is time consuming and expensive, especially for complicated circuits.

To overcome some of these problems of the prior art, it has been proposed to make so-called sensitizing inks containing a sufficient amount of a material, which is autocatalytic for the deposition of metal from electroless metal plating solutions, for example, metal powders or metal compounds which can be readily converted to metal, to silk-screen the desired circuit and to coat walls of passageways in the laminate. This technique will cause metal plating from electroless plating solutions to occur only in those areas where the ink has been deposited. This technique, although overcoming the wastefulness of the noble metal requires special compounding of the inks for each of the type of synthetic resin used in the substrate, e.g., the resin used in making the laminate, to insure proper adhesion of the ink to the substrate, since any separation of the ink from the substrate during electroless plating, during additional metal deposition by electroplating or during use of the finished circuit board will result in destruction or failure of the circuit. Furthermore, the concentration of these autocatalytic agents must be high enough that the resin binder used as a vehicle for the autocatalytic particles does not completely encapsulate the autocatalytic particles so that they are rendered inert to the electroless plating solution. This process also requires that silk-screens be prepared for each particular circuit and a time consuming careful coating of the walls of the many passages which generally are required for interconnection between the circuits on both sides of the substrate.

To overcome some of these latter problems, it has been proposed to incorporate the autocatalytic agents mentioned above in the resin used in making the laminate or substrate. Masking can then be done by any desired means and the passageways formed after masking. Such a procedure requires that the autocatalytic particles be distributed throughout the entire laminate. When such autocatalytic particles are metal, they must not be in such a high concentration that they cause short-circuits due to particle-to-particle contact, yet they must be in a sufficient concentration that the plating of the metal they initiate in the electroless plating solution will form a continuous metal path on the surfaces where they are exposed. This demands an accurate control of the concentration and very uniform distribution of the autocatalytic particles.

To overcome this problem, it has been proposed to use particles which although themselves are not autocatalytic to electroless plating solutions, can be rendered autocatalytic by chemical treatment. Typical of such compounds, and the most readily available, is cuprous oxide which upon treatment with sulfuric acid is known to disproportionate to the cupric salt of the acid and copper metal. Although, such a technique has been used, the results are somewhat unpredictable. Sometimes, for no apparent reason, plating from the electroless plating solution does not occur on the treated areas, thus requiring the entire circuit board to be scrapped.

Another proposal has been to treat an inert filler with the stannous salt solution, wash, treat with a noble metal salt solution, wash and dry to produce such a thin coating of the noble metal that it is essentially non-conductive but will cause metal to plate from an electroless metal plating bath. These fillers are incorporated into a synthetic resin used to prepare the laminates or substrates. Such a procedure overcomes many of the problems encountered with the other techniques mentioned above, but it still suffers from the major difficulty in that the major amount of the noble metal used is essentially wasted since it must be incorporated uniformly throughout the whole resin matrix, to insure that it will be present in any area, including walls of holes where electroless plating is desired and this requires more of the noble metal than treatment of only the surfaces.

It is an object of our invention to provide a solid synthetic resin composition on which decorative metal deposits or electrically conductive paths can be formed on the surface by electroless plating techniques.

It is another object of our invention to provide a solid synthetic resin composition having metal clad surfaces which can be etched to produce the desired electrically conductive paths, and interconnections between the circuits can be made through the body of the synthetic resin by electroless plating techniques without wasting the expensive noble metal salts.

It is still another object of our invention to provide means for making decorative metal patterns on the surface of any desired synthetic resin by an economical and effective electroless plating technique.

It is still a further object of our invention to provide a process for accomplishing the above stated objectives.

These and other objects and advantages of this invention will become apparent from the following description and appended claims.

With the above objects in view, the present invention relates to laminated structures incorporating a solid, synthetic resin containing a stannous compound. Our copending application Ser. No. 163,412, filed July 16, 1971 as a division of this application, claims the process of making electrically conductive paths on the surface of synthetic resins incorporating the stannous compounds disclosed in the instant application.

The invention will be better understood from the following description taken in conjunction with the accompanying drawing in which.

Figure 1:
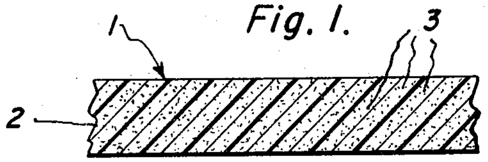
FIG. 1 is a cross-sectional view of a shaped article made from the composition of this invention.

We have now discovered that any synthetic resin can be made so that its surface will react with and be activated by a solution of a noble metal salt only in those areas where metal plating is desired. Our procedure not only saves a considerable amount of the expensive noble metal salt but also greatly simplifies the entire procedure used in electroless plating of the object. These objectives are accomplished by incorporating a stannous compound in the synthetic resin. Other materials, for example, dyes, pigments, fillers, flow control agents, etc., as well as vulcanizing or curing agents, for example, cross-linking agents for the synthetic resin can be present, if desired. The stannous compound can be any stannous compound whether it is soluble or insoluble in the synthetic resin. These compositions can be used to make moulding composition, coating compositions, or can be used as impregnant, for absorbent, electrically non-conductive, sheet material, for example, fabrics, matted fibers, papers, etc. made from cotton, linen, asbestos, glass fibers, cellulose pulp, etc., and the sheets molded into laminates.

The stannous compound contained in such objects is generally encapsulated within the resin matrix and will not react with the noble metal salt, but can be exposed by abrading the surface, for example, by sandblasting, vaporblasting (i.e., use of a suspension of abrasive in a liquid vehicle), sanding, etc. The abrasion of the surface and exposing of the stannous compound can be controlled to produce any desired pattern in the final metal plated article. When the article is treated with a solution of a noble metal salt, only those areas where the stannous compound is exposed so that it can react with and reduce the noble metal salt will be activated with the noble metal, thus, greatly conserving the amount of noble metal salt used. After draining and washing with water to remove any excess noble metal salt solution, only those areas now activated with the noble metal will be plated with metal when treated or immersed in an electroless metal plating solution. Therefore, the desired decorative pattern or electrically conductive paths will form only on the surfaces of the synthetic resin article where the stannous compound has been exposed.

In general, the amount of stannous compound which we incorporate in the synthetic resin is not critical. However, the amount of stannous compound should be sufficient to be effective in reducing the noble metal salt to metal at a sufficient number of sites on the surface of the object that metal deposited from the electroless metal plating solution will entirely cover the desired area. Since it is the actual amount of tin in the stannous compound which determines the amount of noble metal which will be reduced and deposited on the surface, the percentages in the following discussion are those of the actual weight of tin present in the stannous compound, designated hereinafter as Sn(II). It is readily apparent that the amount of Sn(II) present in a stannous compound is dependent on the particular compound. For example, the amount of Sn(II) in one gram of stannous octoate is less than the amount of Sn(II) in tin acetate, which in turn is less than the amount of Sn(II) in stannous oxide. Therefore, the actual percentages of a particular stannous compound used is adjusted to give the desired amount of Sn(II).

We have found that as little as 0.5% Sn(II) based on the weight of the synthetic resin is sufficient, but a shorter time of treatment with the noble metal salt solution is required if the amount of Sn(II) is at least 1%. Although relatively large amounts of the stannous compound can be incorporated in the synthetic resin if desired, without detrimental affect, amounts of Sn(II) greater than 10% have never produced any better results or advantage than lesser amounts in our products or process. Generally, we have found that optimum results are obtained when the amount of Sn(II) is in the range of 1.5 to 5% by weight based on the weight of the synthetic resin.

As previously mentioned, we can use stannous compounds that are either soluble or insoluble in the synthetic resin matrix. The particular organic or inorganic moiety associated with the tin in the stannous compound is not critical and has no effect on the practice of our invention. In general, synthetic resins are organic materials and, therefore, the stannous compounds that we can use which generally will be soluble in the resins are stannous salts having an organic moiety which is compatible with the particular resin, for example, stannous salts of organic acids, for example, stannous acetate, stannous propionate, stannous butyrate, stannous caproate, stannous octoate, stannous naphthenate, stannous laurate, stannous palmitate, stannous oleate, stannous stearate, stannous oxalate, etc., including the same salts wherein the acyl radical is subsituted with hydroxy, halo, keto, etc., substituents for example, stannous tartrate, stannous chloroacetate, stannous acetylbenzoate, etc. Not all of these stannous salts are soluble in all synthetic resins. In those cases where the particular stannous salt is not soluble in a particular resin, the salt can be used as the insoluble stannous compound. The stannous salts or inorganic acids, e.g., stannous chloride, stannous sulfate, stannous phosphate, etc., stannous sulfide, stannous oxide, etc., are examples of stannous compounds we can use which, generally, are insoluble in the synthetic resins. Although dialkyl tin compounds, for example, dimethyl tin, diethyl tin, dicyclohexyl tin, etc., and diaryl tins, for example, diphenyl tin, ditolyl tin, diphenanthryl tin, etc. can also be used, these tin compounds are very prone to oxidation to the corresponding dialkyl diaryl tin oxides, in which the tin is in the tetravalent state, which would not be capable of reducing a noble metal salt to the metal. Therefore, when these compounds are used, extreme precaution must be used to prevent such oxidation, either prior to the incorporation in the synthetic resin or when such tin compounds are exposed prior to treatment with the noble metal salt solution.

Certain stannous compounds, especially stannous salts of organic acids, are known to be capable of curing certain synthetic resins, for example, epoxy and silicone resins. These known stannous compounds which act as curing agents, we classify as stannous compounds which are reactive with the synthetic resin. In utilizing such stannous compounds to produce the desired shaped article from resins with which they will react, they must be added just prior to the use of the resin, especially when used in amounts greater than 1% since this amount of tin compound is generally greater than used when it is being used solely as a curing agent. Therefore, the curing reaction is greatly enhanced when such amounts are used. In such cases, we prefer to use a stannous compound which is inert, i.e., inactive in curing the resin. Such synthetic resins which have been cured with a stannous compound are known compositions of matter and, therefore, are excluded from the scope of our product claims by specifying that the stannous compounds must be inert to the synthetic resin. However, such products have never been used, in so far as we know, in carrying out our process, now claimed in our above-referenced divisional application, wherein the stannous compound is exposed on the surface of the article so that it can reduce a noble metal salt to the noble metal thereby catalyzing such surfaces so that they will cause deposition of metal from electroless plating solutions. Therefore, such compositions are included within the scope of our process claims.

Since stannous oxide is the most readily available commercial product at the lowest price for the amount of Sn(II), is stable under atmospheric conditions and under the processing conditions needed to mold and shape articles from the synthetic resin containing it and is nonreactive with all known synthetic resins, it is the preferred compound generally incorporated in the synthetic resin. However, any stannous compound can be used which is sufficiently stable that it can be incorporated in synthetic resins, is not too readily oxidized to the stannous state, and will not deleteriously effect the particular synthetic resin.

Any synthetic resin is a suitable matrix in which to incorporate our stannous compounds. They can be thermoplastic resins, for example, polymers, including homopolymers and copolymers, e.g., random, block and graft copolymers of ethylene, propylene, styrene, chlorostyrene, vinyl chloride, vinyl acetate, acrylic and methacrylic esters, etc. or they can be poly-(phenylene oxides), polysulfones, polyamides, polyimides, polycarbonates, silicones, etc. They may also be thermosetting or vulcanizable polymers, for example, the various polymers, including random, block and graft copolymers of butadiene, isoprene, etc., silicone resins, unsaturated alkyds, phenolic resins, urea resins, melamine resins, epoxy resins, polyurethanes, including the thermoplastic resins listed above which have an agent capable of causing cross-linking incorporated therein, e.g., a peroxide, etc., or are cross-linked by means of irradiation by ionizing radiation, etc. Since the synthetic resin serves no function, insofar as our invention is concerned, other than as a matrix in which the stannous compounds are incorporated, the particular choice of the synthetic resin is based solely upon the properties one desires in the final product. For example, if one desires a synthetic resin that is readily injection moldable, one would choose a thermoplastic resin. If one desires a product which is capable of withstanding elevated temperatures, one would choose a thermosetting resin or a thermoplastic resin having a softening point higher than the elevated temperature to which the object would be subjected. The actual choice of the synthetic resin is not critical for our invention.

Any means may be used for incorporating the stannous compounds in the synthetic resin. If the synthetic resin is a thermoplastic resin, incorporation can be accomplished by mixing on differential rolls, milling, Banburying, etc., or any other procedure used for blending synthetic resins with for example, colors, dyes, pigments, fillers, plasticizers, etc. In fact, if such ingredients also are being compounded with the synthetic resin, the desired stannous compound can be incorporated at this time. If the stannous compound is soluble in a solvent, in which the synthetic resin is also soluble, the two solutions may be blended together followed by evaporation of the solvent. If the particular resin is liquid, for example, a liquid thermosetting resin, for example, an epoxy resin, which cures to a solid state, during the curing process, the stannous compound can be added directly to such liquid resin, with or without the aid of a solvent. In the case of an insoluble stannous compound, for example, stannous oxide, it can be added in the same way as a filler is added to the synthetic resin or dispersed in a solution or in the liquid resin using standard techniques for compounding the resin with pigments or fillers. The actual means used in producing the synthetic resin containing the stannous compound is not critical and any of the various means can be used.

When the desired finished article is a laminated board, liquid resin containing the stannous compound or a solution of the solid synthetic resin, containing either the dissolved or suspended stannous compound, is used to impregnate an absorbent web of an electrical insulating material. Such a web may be paper, woven or matted cloth fabric of cotton, linen, glass fibers, asbestos fibers, etc. Its composition is not critical. The actual production of laminated, molded or shaped articles, is a technique well known in the art and needs no further discussion.

After the synthetic resin containing the stannous compound has been converted into the desired shape by molding, casting, etc., we have noted that the surface of the shaped article, in a great many cases, will not react with a noble metal salt solution until the surface is abraded. This is a desirable feature since it permits one to expose the stannous compound only in desired areas by abrading only such areas. Whether a particular combination of synthetic resin and stannous compound will have this feature is somewhat dependent on the concentration of the stannous compound as well as the particular combination. As one would expect, a particular soluble stannous compound will be more readily soluble in one synthetic resin than it is in another or an insoluble stannous compound will be more readily wet by and encapsulated in one synthetic resin than it is in another. Also, as would be expected the higher the concentration of a particular stannous compound is in a particular resin, the more likely it is that some of the stannous compound will be exposed in the surface.

Whether a particular combination will require abrasion to expose the stannous compound is readily ascertained by taking the final shaped article made from the composition and sawing out a test part. The test part is treated with the noble metal salt solution, washed and then placed in an electroless plating solution. Depending on whether plating occurs only on the cut edges or over the entire surface, one will know whether abrading will or will not be required to expose the stannous compound. Generally, even though abrasion is not required, abrasion will still be desirable to improve adhesion of the metal plate to the substrate and also to more completely expose the stannous compound when, initially, it is only partially exposed in the surface. Many times a treatment of either the abraded or non-abraded surface with an aqueous alkali or mineral acid prior to treatment with the noble metal salt, and also acidifying the noble metal salt solution with a mineral acid will enhance the reaction between the noble metal salt and the stannous compound. When used, the alkali or acid and its concentration should be so chosen that it does not deleteriously attack the particular synthetic resin present in the article.

If the surface of the object, as produced, has the stannous compound already exposed, the areas where plating is not desired are masked by any suitable technique, for example, by photoresist techniques, silk screening, etc. to cover such areas with an adherent coating of any material which is non-reactive with either the noble metal salt or the electroless metal plating solution, generally a synthetic resin, varnish, paint, ink, etc. If the stannous compound is not exposed, the entire surface can be abraded and then masked as above or only the areas where it is desired to expose the stannous compound can be abraded, using a mask, if required, to prevent abrasion of those areas where it is not desired to expose the stannous compound. Exposure of the stannous compound will be accomplished automatically when any mechanical operation, for example, drilling, broaching, sawing, punching, sanding, etc. is performed on the article.

After the stannous compound is exposed, treatment of the article with a noble metal salt solution, for example a platinum, palladium, gold, silver, etc. salt solution, preferably a palladium salt solution, will cause the noble metal to be deposited only in those surfaces where the stannous compound is exposed. Only those surfaces which have reacted with the noble metal will deposit metal when contacted with an electroless metal plating solution.

The electroless plating solutions may be any of the known electroless plating solutions, for example, those for electroless plating of copper, nickel, cobalt, etc. The particular composition of the electroless plating solution or the particular metal plated is not critical and any of the known solutions can be used.

All of these solutions comprise as aqueous solution of a salt of the metal to be plated, a complexing agent for the metal ion of the salt, a reducing agent to reduce the metal ion to the metal and either an acid or base, depending on the reducing agent, to produce the pH required for the reduction reaction. Other ingredients to stabilize the solution and to improve the quality of the metal deposited, for example, the ductility, brightness, etc. of the metal plate also can be added. All of these solutions have one property in common. They will only plate metal on the surface of a metal or a surface which has been activated by deposition of metal atoms, for example by treatment of a non-metallic surface with a stannous solution, generally stannous chloride, followed by treatment of a noble salt solution, generally, palladium chloride. This treatment deposits the palladium on the treated surface. Only a very small amount of palladium is required to be effective, so much so, that one can use such dilute solutions of the stannous and noble metal salt solutions that the actual deposit of the noble metal is invisible to the eye. Since our compositions are capable of producing the required deposit of the noble metal, they can be used with all of the known noble metal-activatable electroless metal plating solutions to cause these solutions to plate their metal on any desired surface area of our compositions.

After the electroless metal has been deposited, further deposition of either the same or a different metal can be accomplished either by electroless plating techniques or by electroplating techniques. The above aspects of our invention are illustrated in the drawing.

FIG. 1 illustrates one embodiment of our invention, comprising an article or object, which may be any desired shape but in the drawing is illustrated as being a flat plate, made from a composition comprising a synthetic resin, 2 having incorporated in its the stannous compound 3, which, for purposes of illustration, is shown as being insoluble, discrete particles distributed throughout the matrix of synthetic resin 2. It is to be understood that the stannous compound 3 can be dissolved in resin 2. Article 1 may be either a compression molded, extruded, injection molded or otherwise shaped article or can comprise sheets of paper, cloth, etc., previously described, which has been impregnated with the synthetic resin 2, in which the stannous compound 3 is either dissolved or suspended, therein and the sheets placed one on the top of the other and molded to produce a laminated article.

Figure 2:
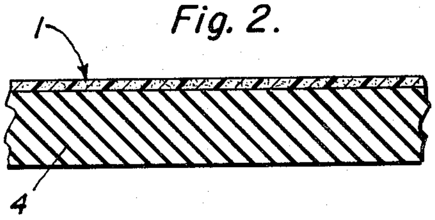
FIG. 2 is a cross-sectional view of an object made from the composition of this invention laminated or bonded to an electrical insulating substrate.

FIG. 2 illustrates another embodiment of our invention whereby the article or composition 1 described above with reference to FIG. 1 is laminated or integrally bonded to substrate 4 which is an electrical insulating body.

Figure 3:
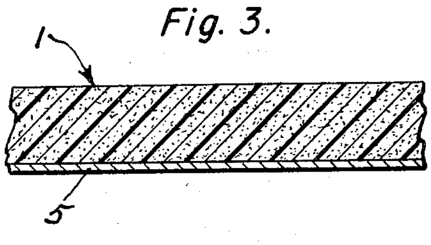
FIG. 3 is a cross-sectional view of a shaped article formed of the composition of this invention laminated or bonded to a metal sheet or foil.

FIG. 3 illustrates another embodiment of our invention, which is a variation of FIG. 2, wherein the article 1 described with reference to FIG. 1 has a sheet or foil of metal 5 laminated or integrally bonded to one side. If desired, the sheet or foil 5 can be on the upper side as well as on the lower surface as illustrated.

The articles shown in FIGS. 1 and 2, can be treated as previously described to cause the stannous compound 3, to be exposed over the entire surface or only over the desired areas of the surface of synthetic resin 2. To insure that the noble metal will be deposited in only those areas where it is desired, generally, all other areas of the surface of composition 1 is covered with a mask by any of the standard techniques, for example, by silk-screening, photoresist techniques, painting, etc. As will be obvious to those skilled in the art, the material used in producing such a mask should itself not be reactive with the noble metal salt solution. It can be, for example, any film forming synthetic resin, such as disclosed above as the matrix for the stannous compound, for example, an epoxy resin, a phenolic resin, a solution or a preformed film of a thermoplastic resin which is caused to adhere to the surface, for example with an adhesive. The exact composition of the mask and the means of applying are not critical other than the material must be nonreactive with the noble metal salt or plating solution.

The use of a mask will insure that none of the stannous compound contained in composition 1 is exposed in the non-desired areas. The use of a mask also can aid in abrading, for example, by sand-blasting or vapor blasting techniques previously described, those areas where it is desired to exposed the stannous compound while protecting those areas where it is not desired to expose the stannous compound.

The same technique described above may be used in the embodiment illustrated in FIG. 3 for producing exposed areas on the top surface of article 1 where it is desired to plate a pattern or cover the entire top surface with metal. In case an electrical connection is desired between the pattern on the surface and the metal surface 5 which itself can be a desired pattern of metal, a passage, for example, a hole, slot, etc. is formed by any suitable means, for example, by drilling, punching, etc., from the top surface to the bottom surface thus simultaneously exposing the contained stannous compound in composition during formation of the passage.

Figure 4:
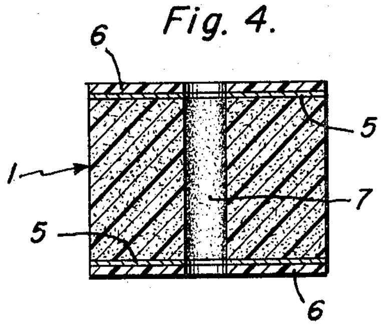
FIG. 4 is a cross-sectional view of a shaped article formed from the composition of this invention laminated or bonded to two metal sheets or foils, one on each of its two major surfaces, which have been covered with a masking composition and a hole drilled through the composite to form a passage prior to making an electrical connection between the two metal sheets or foils.
Figure 5:
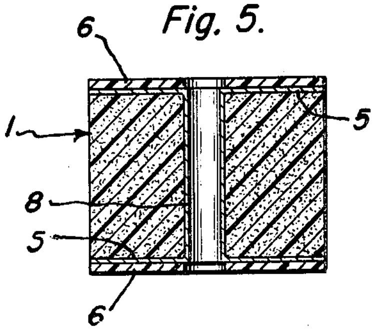
FIG. 5 is the same as FIG. 4, after the electrical connection has been made by the deposition of metal from an electroless metal plating solution on the walls of the hole.

This is further illustrated in FIG. 4 wherein the article 1 described with the reference to FIG. 1 has metal sheet or foil 5, laminated or bonded to both its upper and lower surfaces and the outer surfaces of both metal laminae are covered with mask 6. Mask 6 can be one used in forming the desired pattern or design by etching away the metal not covered by the mask, using standard techniques. In this case it is generally desirable to apply a second coating of masking material to completely cover the surface of the composite to insure covering of any stannous compound exposed by the etching process. A passageway 7, illustrated as a drilled hole, is then formed which exposes the contained stannous compound in composition 1 on the walls of the hole. When treated with a noble metal salt solution, the noble metal will be deposited only on the walls of passage 7 so that when treated with an electroless metal plating solution, metal will deposit only on the walls of the hole as shown in FIG. 5 which is the same as FIG. 4 except that now, metal from the electroless plating solution has formed metal layer 8, thus making an electrical connection between the metal layers 5 on each surface.

These and other embodiments of our invention will be readily apparent to those skilled in the art from the above description and the following specific examples.

In order that those skilled in the art may better understand our invention, the following examples are given by way of illustration and not by way of limitation. In all the examples, percentages are by weight unless otherwise specifically started. The percentages for the stannous compound are for the named compound from which the percentage of Sn(II) is readily determined.

EXAMPLE 1

A master batch of an epoxy resin was made containing 400 g. of a polymeric glycidyl ether of 2,2,-bis(4-hydroxyphenyl)propane having a molecular weight in the range of 350–400 and a epoxide equivalent of 175–210 (Epon 828), containing 30 g. of a fumed silica to impart thixotropic properties to the resin and 4 g. of a complex polymeric viscous liquid (Modaflow) as a leveling agent. These last two ingredients are not essential and can be omitted if desired. They were included so that this same material, without any added stannous compound, could be used as the masking material, to demonstrate the effectiveness of the added stannous compound in the practice of this invention.

There was dissolved in 25 g. of the above liquid epoxy resin, 8 g. of stannous octoate (28% Sn) and 6 g. of aminoethylpiperazine (curing agent for resin). The solution was poured into a casting tray to produce a cast slab approximately ¼ inch thick. The resin was self-curing and exothermed on standing at room temperature. After curing, the casting was sawed into several test pieces. One piece was dipped into a solution of 100 g. of sodium hydroxide dissolved in 700 ml. of water for five minutes, rinsed with water and dipped into an aqueous solution containing 1 g. of palladium chloride and 10 ml. of concentrated hydrochloric acid per liter for one minute. After rinsing with water it was placed in a standard, commercially available electroless copper plating bath comprising an aqueous 0.25 molar solution of copper sulfate complexed with sodium potassium tartrate made alkaline to a pH of 12–14 with sodium hydroxide, and using formaldehyde as the reducing agent. Copper was deposited only on the cut edges. Holes were drilled in another piece and when similarly treated, copper plated only on the cut edges and on the walls of the drilled holes, thereby demonstrating that the palladium chloride had only been reduced to palladium metal and had activated only the surfaces which had been abraded either by sawing or drilling.

EXAMPLE 2

Example 1 was repeated twice except that the amount of aminoethylpiperazine was reduced to 4 g. In one batch, the amount of stannous octoate was reduced to 4 g. and in the other batch of resin to 1 g. After casting and curing these two batches of resin as described in Example 1, test pieces were cut and drilled and treated with sodium hydroxide and palladium chloride solution as described in Example 1. Again, copper plated on only the cut edges and walls of the drilled holes. The resin containing only 1 g. of stannous octate was slower to start plating than the sample containing 4 g. of stannous octoate but still plated satisfactorily.

Initially, the sodium hydroxide treatment had been used on the belief that it would be desirable to convert the stanious compound to an insoluble stannous oxide or stannous hydroxide. However, when the sodium hydroxide treatment was omitted and also when a treatment with either undiluted or 80% aqueous sulfuric acid were used in place of the sodium hydroxide treatment, cut and drilled samples of the compositions of this example, when treated with the palladium chloride solution, also, were activated and plated copper from the electroless copper plating solution only on the cut edges and drilled holes. Treatment with sulfuric acid caused plating to be initiated more quickly than the sodium hydroxide treatment which, in turn, caused plating to be more quickly initiated than those test pieces were treated directly with the palladium chloride solution. Apparently, the sawing and drilling cause some smearing of the resin matrix over the stannous compound which the sodium hydroxide or sulfuric acid treatment removes so that plating occurs rapidly. Therefore, this example illustrates that although this treatment wih sodium hydroxide or sulfuric acid is not essential, beneficial results can be obtained by using either one prior to the immersion in the noble metal salt solution. Longer immersion in the palladium chloride solution in those samples not receiving the sulfuric acid or sodium hydroxide treatment, also improved the speed of initiation of the plating from the electroless metal plating solution.

EXAMPLE 3

A 4 inch by 4 inch opening was cut in a 1/16 inch thick sheet of silicone rubber. This sheet was placed over a 1.5 mil thick copper foil so that the copper foil formed a closure for the bottom of the opening. A master batch of resin was made up containing 200 g. of the epoxy resin of Example 1, 15 g. of a fumed silica and 32 g. of stannous octoate. A 25 g. portion of this resin was mixed with 4 g. of aminoethylpiperazine and spread in the opening in the rubber sheet. The top portion of the rubber sheet was covered with a 1.5 mil thick copper foil. This assembly was placed between the two platens of a hydraulic press and cured at 100° C. for 45 minutes using sufficient pressure to maintain good contact between the copper foil and resin to produce a sheet of the resin with the copper foil laminated to both sides of the resin. Since the copper surfaces would cause deposition of metal from the electroless metal plating, they were masked with the composition of Example 1 but the tin octoate was omitted. After the masking composition was cured, holes were drilled in these sheets perpendicular to the copper plating. After cleaning the surfaces of the hole by dipping first in 80% aqueous sulfuric acid solution, rinsing and then in the sodium hydroxide solution containing 100 g. of sodium hydroxide per liter and washing with water, the sheets were dipped in the palladium chloride solution, washed and placed in the electroless copper plating solution previously described. Copper was plated only on the walls of the drilled holes including the exposed edges of the copper foil around the periphery of the holes, thus making an electrical connection between the two copper surfaces through each hole.

EXAMPLE 4

The previous example was repeated to produce an 8 x 8 x 1/16 inch laminate with copper foil on each side. Using standard etching techniques, an electrical circuit was produced on both sides of the copper-clad structure. Since the etching process could have exposed some of the stannous compound, the entire surface of the composite was masked with the composition made from 25 g. of the master batch of Example 1 mixed with 2 g. of m-phenylene diamine as curing agent, dissolved in 2 g. of dimethylformamide and cured for 36 minutes at 150° C. Holes were drilled through the structure from one circuit to the other. The structure was immersed in the sodium hydroxide solution, washed and then dipped in the palladium chloride solution as previously described. After immersion overnight in the electroless copper plating solution, the walls of the holes were well plated with copper, thus making an electrical connection between the circuits on both sides of the composite. No copper had deposited on any other surface of the composite.

EXAMPLE 5

Example 1 was repeated except that the stannous octoate was replaced in separate 25 g. batches of the resin with 0.5 g. of stannous oxide, 0.25 g. stannous oxide, 0.18 g. of stannous oxide, 0.5 g. stannous oxalate and 0.5 g. of stannous acetate. Each of these castings, after cutting and drilling, immersing for 2 to 3 minutes in an 80% aqueous sulfuric acid solution, rinsing with water and then dipping in the palladium chloride solution described in Example 1 for 2 to 3 minutes, readily plated copper from the electroless copper plating solution. Sufficient copper plating in the holes and along the cut edges was accomplished in 15 minutes to deposite a visible film of copper. Additional copper was deposited by keeping the test pieces in the electroless copper plating solution for a longer period of time.

Similar results are obtained when the epoxy resin used in the above examples is replaced with other known epoxy resins, for example, an epoxidized phenolic novolak resin having an average molecular weight of 325 and an average of 2.2 epoxy groups per polymer molecule. Likewise other curing agents than those specifically mentioned can be substituted for the curing agents used above, for example, phthalic anhydride, hexahydrophthalic anhydride, maleic anhydride, dodecenyl succinic anhydride, etc., wherein these anhydrides are used in conjunction with a small amount of a tertiary amine catalyst for example $\alpha$-methylbenzyl dimethyl amine, etc. The particular curing agent used with a particular epoxy resin is not critical to our invention.

Likewise, the particular polymer matrix is not critical. In place of an epoxy resin, we have found that the epoxy resin can be substituted with any of the known thermosetting resins previously mentioned, for example, the phenol-formaldehyde resins, urea-formaldehyde resins, melamine-formaldehyde resins, polyurethane resins, or any of the known thermoplastic resins previously mentioned, for example, polyethylene, polypropylene, polystyrene, polymethyl methacrylate, polyvinyl chloride, poly(phenylene oxides), polyimides, polyesters, etc. Likewise, other noble metal salt solutions can be used but palladium chloride is preferred.

EXAMPLE 6

A large master batch of resin was made up containing 1000 lbs. of an 80% acetone solution of a polymeric glycidyl ether of 2,2-bis(4-hydroxyphenyl)propane, having an average molecular weight of 900 to 1000 and an epoxide equivalent of 450–425, 32 lbs. of dicyandiamide, 8 lbs. of tetraethylenepentamine, 300 lbs. of the monomethyl ether of ethylene glycol and 164 lbs. of acetone. Portions of this master batch had dispersed in them, 0.6%, 1.8%, 3%, 5% and 10% respectively of stannous oxide. These resin solutions were used to impregnate glass fiber cloth.

After evaporation of the solvent, the cloth was cut into sheets and used to prepare 1/16 inch laminates clad on both sides with 1 oz./ft.$^2$ copper foil. These composites were molded at 165–175° C. at 1000–1500 lbs. per square inch pressure in a laminating press until the resin was cured. Test plaques cut from each of these laminates were prepared in which the copper surfaces were masked with an epoxy resin. Holes were drilled perpendicular to the copper cladding. The walls of the holes were cleaned by dipping in aqueous 80% sulfuric acid, washed with water and then treated with the palladium chloride solution. When immersed in the copper plating solution, copper was deposited on the walls of the holes in all of the laminates. The plaque containing 0.6% stannous oxide required a longer time of immersion in the palladium chloride solution and required a longer time to initiate copper plating than the other plaques. The results of this test indicated that as far as quality and speed of plating copper on the walls and holes were concerned, there was nothing to be gained by using an amount of a stannous compound to supply greater than about 2% Sn(II) in the resin.

In place of palladium chloride solution, solutions of other palladium salts as well as other noble metal salts, for example, platinum chloride, chloroplatinic acid, silver nitrate, gold chloride, etc., which are reducible to free metal by the stannous compound, can be used. When an electroless nickel plating solution containing an aqueous acetic acid solution of nickel chloride adjusted to a pH of 4.5 with sodium hydroxide and using sodium hypophosphite as the reducing agent was used in place of the copper plating solution, nickel was deposited in place of copper on the activated walls of the holes.

EXAMPLE 7

Sheets of kraft paper were impregnated with an alcoholic solution of a phenol-formaldehyde resin having suspended therein 2% stannous oxide based on the resin content. After evaporation of the alcohol, the sheets were converted into laminates as described in Example 7, in one case with and, in the other case, without the copper foil on the surfaces. Test plaques were cut from each of the laminates. The copper surface was masked with an epoxy resin. Holes were drilled in both plaques. When both plaques were treated as described in Example 7, the walls of the holes and cut edges in both plaques were uniformly plated with copper, as was the surface of the plaque not having the copper foil. Abrasion or the treatment with sulfuric acid was required on the surface of the plaque not having the copper foil to expose the stannous oxide.

EXAMPLE 8

A dioxane solution was made containing 17.7% by weight of a copolymer of acrylonitrile, butadiene and styrene (known in the trade as ABS), and 4% by weight of stannous octoate, based on the ABS. The solution was spread in a shallow pan, and the solvent evaporated. This resin was molded into a thin slab and cut into strips. One strip was dipped for 1 minute in an 80% aqueous sulfuric acid solution, rinsed with water and then dipped for one minute into the previously described palladium chloride solution. Another strip was dipped for 1 minute in an 80% aqueous sulfuric acid solution, water rinsed, dipped for 1 minute in a dilute aqueous sodium hydroxide solution, water rinsed, then dipped for 1 minute in the palladium chloride solution. The third strip was dipped for 2 minutes in the palladium chloride solution. All three strips, when placed in an electroless copper plating, plated copper over the entire surface. In this polymer matrix, apparently the stannous compound is already exposed in the surface and does not require any abrading treatment.

Similar results were obtained when this example was repeated, but the amount of stannous octotate increased to 6.8% in one case and decreased to 1.7% in the other case. Likewise, similar results were obtained when, instead of making a solution of the polymer and the stannous octoate, the polymer and stannous octoate were blended by milling on hot differential rolls at 150° C.

EXAMPLE 9

The composition made by milling 4 g. of stannous octoate into 50 g. of polyvinyl chloride was pressed into a thin slab and cut into strips. A 1 minute dip in concentrated sulfuric acid, rinsing with water and dipping for 1 minute in the palladium chloride solution, rinsing and placing in the previously described copper plating solution was effective in causing copper to plate over the entire surface. In this case, the sulfuric acid treatment or abrasion was required to expose the contained stannous compound. Apparently, the concentrated sulfuric acid etched the surface of the polyvinyl chloride sufficiently to expose the stannous octoate.

When polyethylene was substituted for the polyvinyl chloride in this example, the acid treatment was not required and dipping directly in the palladium chloride solution was sufficient to cause copper plating from the electroless copper plating bath. When a strip of this polyethylene was dipped in an aqueous solution containing 10 g. of silver nitrate in 500 ml. of solution, which is approximately 20 times stronger than that normally used for seeding or activating surfaces for electroless metal plating, the tin compound caused a reduction of the silver nitrate to silver to such an extent that a black deposit of silver was visible on the surface. It may have been that the stannous octoate had migrated to the surface of the polyethylene. If this is so, a stannous compound that is completely insoluble, for example, stannous oxide, would be better to use since it will not migrate.

EXAMPLE 10

A high impact grade of polystyrene was milled with 1 g. of stannous octoate and molded into a slab. A test strip of this material when immersed in concentrated sulfuric acid for 5 minutes followed by a water rinse and a 5 minute dip in the palladium chloride solution would not cause copper to plate out from the electroless copper bath. However, when vapor blasted, that portion of the surface which was abraded now was reactive with the palladium chloride and was plated after the palladium treatment when placed in the electroless copper plating bath.

EXAMPLE 11

Separate blends of 1 g. of stannous oxide and 50 g. of polyethylene, high impact grade polystyrene and ABS (see Example 8) were molded of the three compositions. When a plaque of each composition was immersed for 5 minutes in concentrated sulfuric acid, washed with water, immersed 5 minutes in the palladium chloride solution and washed with water, all but the polyethylene plaque were uniformly plated with copper when immersed in the electroless copper plating solution. The polyethylene plaque was non-uniformly plated, but was uniformly plated when the surface was abraded by vapor blasting before being subjected to the above treatment.

When the above test was repeated with high impact grade polystyrene, but the amount of stannous oxide was decreased to (a) 0.5, (b), 0.25, (c) 0.1 g. and (d) omitted, (a) required abrasion before treatment (b) and (c) produced spotty plating even after abrasion and (d) would not plate at all. These results demonstrate that the concentration of the stannous compound should be such that the amount of Sn(II) is at least 0.5% by weight of the synthetic resin.

The above examples illustrate that the particular polymer matrix containing the stannous compound is not critical and the particular stannous compound is not critical. Variations can be made to adapt the particular resin and stannous compound to meet the requirements of any particular application. Likewise, the particular electroless metal plating solution is not critical. Any electroless plating solution can be used which will not plate on a non-metallic surface unless activated by the presence of a metal nuclei on the surface. Such solutions are well known in the art for the electroless plating of different metals, for example copper, nickel, cobalt, silver, etc. as well as alloys where several metals are deposited simultaneously. Copper is the preferred metal for electrical applications and where another metal is to be electrodeposited on top of the electroless-deposited metal. Typical of the art disclosing electroless plating solutions we can use are U.S. Pats. 2,532,283, Brenner; 2,871,139, Wein; 2,879,175, Umblia et al.; 2,938,805, Agens; 2,942,990, Sullivan, etc.

The treatment of non-metallic surfaces with the noble metal salt is essential for the deposition of metal from the electroless plating solution. We have found that its omission results in our compositions failing to plate metal from the electroless plating solution. Likewise, those surfaces which are contacted with the noble metal salt solution will not be activated providing the stannous compound has not been exposed, in the surface prior to treatment with the noble metal salt. Therefore, the noble metal salt is consumed only in those areas of our compositions where the stannous compound has been intentionally exposed thereby greatly conserving the amount of expensive noble metal salt required and also simplifying the required process steps.

It is obvious from the above description that our compositions are extremely useful in making metal plated objects for either decorative or utilitarian use and especially useful in the making of printed circuit boards on which various electronic components are mounted to produce electronic devices, for use in radios, television sets, computers, etc.

Although the above examples have shown various combinations and variations of the present invention, other modifications and variations will be readily discernable to those skilled in the art in light of the above teachings. For example, although the above examples illustrated the use of making flat plate-like objects, our compositions can be molded into a wide variety of shapes, for example, knobs, handles and indeed into any desired shape and the compositions thereafter plated with any desired metal from an electroless plating solution. The metal plated objects so obtained can be further metal plated from electroless plating solutions or by an electroplating technique to provide either a thicker coat of the same metal deposited initially or an entirely different metal. Certain areas of the initially deposited metal can be masked so that the second plates only a portion of the initial metal layer using a metal having a different color to provide decorative or utilitarian patterns of different colors. Either the entire surface or only desired portions of the object can be plated with metal. If desired the stannous compound can be sorbed, coated or precipitated on the surface of an inert carrier, for example, powdered, solid fillers prior to incorporation in the synthetic resin. Various dyes, pigments, fillers, mold lubricants, plasticizers, etc., can be incorporated in the synthetic resin, etc. There and other changes can be made in the particular embodiment of the invention described which are within the full intended scope of the invention as defined by the appended claims.

What we claim as new and desire to secure by Letters Patent of the United States is:

1. A laminated structure having two major surfaces comprising a substrate having on at least one of its two major surfaces at least one absorbent, electrically insulating lamina which has been impregnated and integrally bonded to said surface with a synthetic resin having incorporated therein a stannous compound, which is inert to said resin, in an amount, based on the contained tin, of from 0.5 to 10% by weight of said resin.

2. The laminated structure of claim 1 wherein all of the laminae are impregnated and integrally bonded together with the tin-containing resinous composition.

3. The laminated structure of claim 2 having metal foil integrally bonded to at least one of the two major surfaces of the laminates.

4. The laminated structure of claim 2 wherein the resin is a cured resin and the stannous compound is stannous oxide.

5. The laminated structure of claim 2 wherein the synthetic resin is an epoxy resin or a phenolic resin and the stannous compound is stannous oxide.

6. The laminated structure of claim 5 wherein copper foil is integrally bonded to at least one of the two major surfaces of the laminate.

7. The laminated structure of claim 2 wherein the laminae are glass-cloth, the synthetic resin is an epoxy resin, the stannous compound is stannous oxide and copper foil is integrally bonded to at least one of the two major surfaces of the laminate.

8. The laminated structure of claim 2 wherein the laminae are paper, the synthetic resin is a phenolic resin, the stannous compound is stannous oxide and copper foil is integrally bonded to at least one of the two major surfaces of the laminate.

References Cited

UNITED STATES PATENTS

| | | | |
|---|---|---|---|
| 1,867,658 | 7/1932 | Dreyfus | 252—8.1 |
| 2,662,957 | 12/1953 | Eisler | 317—101 |
| 2,912,746 | 11/1959 | Oshry et al. | 29—155.1 |
| 3,146,125 | 8/1964 | Schneble et al. | 117—213 X |
| 3,171,756 | 3/1965 | Marshall | 117—212 |
| 3,259,559 | 7/1966 | Schneble et al. | 117—213 X |
| 3,322,881 | 5/1967 | Schneble et al. | 117—213 X |
| 3,399,268 | 8/1968 | Schneble et al. | 117—213 X |
| 3,404,032 | 10/1968 | Collins | 117—212 |
| 3,412,125 | 11/1968 | Welch | 252—8.1 X |
| 3,418,267 | 12/1968 | Busse | 260—33.8 |
| 3,442,683 | 5/1969 | Lenoble et al. | 117—213 X |
| 3,467,540 | 9/1969 | Schick | 117—213 X |
| 3,475,372 | 10/1969 | Gable | 252—8.1 X |
| 2,260,024 | 10/1941 | Hall et al. | 174—121 |
| 2,271,233 | 1/1942 | Smith et al. | 174—125 |
| 2,371,915 | 3/1945 | Rector | 260—38 |
| 2,519,348 | 8/1950 | Burnell et al. | 106—15 |
| 2,599,813 | 6/1952 | Crouch et al. | 260—45.75 |
| 2,690,435 | 9/1954 | Albert | 260—45.75 |
| 2,839,219 | 6/1958 | Groves et al. | 161—214 |
| 3,418,267 | 12/1968 | Busse | 260—33.8 |
| 3,475,372 | 10/1969 | Gable | 260—45.75 |

OTHER REFERENCES

Hedges, E. S., et al., Tin and Its Alloys, Edward Arnold Pub. (London) (1960), p. 79.

Kirk et al., Encyc. of Chem. Tech., vol. 14, Interscience, New York (1965), p. 161.

WILLIAM J. VAN BALEN, Primary Examiner

U.S. Cl. X.R.

161—185, 186, 215, Dig. 7; 204—20